United States Patent [19]

Giusti et al.

[11] Patent Number: 4,883,509
[45] Date of Patent: Nov. 28, 1989

[54] MULTI STAGE GAS INLET CONSTRUCTION FOR DUST COLLECTORS

[76] Inventors: Giambattista Giusti, 50 The Fellsway; Robert W. Duyckinck, 187 Commonwealth Ave., both of New Providence, N.J. 07974

[21] Appl. No.: 155,567

[22] Filed: Feb. 12, 1988

[51] Int. Cl.[4] ............................................. B01D 46/02
[52] U.S. Cl. ........................................ 55/326; 55/334; 55/341.1; 55/418; 55/444; 55/525
[58] Field of Search ................. 55/128, 129, 307, 308, 55/319, 326, 334, 341.1, 341.7, 344, 418, 419, 437, 444, 525

[56] References Cited

U.S. PATENT DOCUMENTS

| | | | |
|---|---|---|---|
| 2,792,075 | 5/1957 | McBride et al. | 55/525 X |
| 2,989,145 | 6/1961 | Goodloe | 55/525 X |
| 3,026,968 | 3/1962 | Kaskinen | 55/525 |
| 3,125,427 | 3/1964 | Smith et al. | 55/525 X |
| 3,185,181 | 5/1965 | Demyan | 55/418 X |
| 3,246,455 | 4/1966 | Boddy | 55/319 |
| 3,353,340 | 11/1967 | Carsey | 55/334 X |
| 3,425,189 | 2/1969 | Haselmayer | 55/418 X |
| 3,739,557 | 6/1973 | Anderson et al. | 55/341.1 X |
| 3,831,350 | 8/1974 | Gilles et al. | 55/418 X |
| 3,831,354 | 8/1974 | Bakke | 55/418 |
| 3,912,634 | 10/1975 | Howell | 55/525 X |
| 3,926,595 | 12/1975 | Böckman | 55/341.1 X |
| 3,944,404 | 3/1976 | Andrasfalvy | 55/341.5 X |
| 3,990,871 | 11/1976 | Cooper | 55/419 X |
| 3,992,177 | 11/1976 | Wetteroth | 55/326 X |
| 4,105,724 | 8/1978 | Talbot | 55/525 X |
| 4,158,554 | 6/1979 | Bundy et al. | 55/341.1 X |
| 4,213,766 | 7/1980 | Wyatt | 55/129 X |
| 4,219,343 | 8/1980 | Peterson | 55/341.4 X |
| 4,227,903 | 10/1980 | Gustavsson et al. | 55/302 |
| 4,283,205 | 8/1981 | Schumann | 55/419 X |
| 4,443,234 | 4/1984 | Carlsson | 55/334 X |
| 4,544,383 | 10/1985 | Haselmaker | 55/418 X |
| 4,655,804 | 4/1987 | Kercheval et al. | 55/341.1 X |

FOREIGN PATENT DOCUMENTS

| | | | |
|---|---|---|---|
| 865339 | 9/1981 | U.S.S.R. | 55/341.1 |
| 922730 | 4/1963 | United Kingdom | 55/128 |

*Primary Examiner*—Robert Spitzer

[57] ABSTRACT

An improved gas stream inlet construction for industrial gas treating apparatus such as fabric type dust collectors that includes two series arranged velocity reducing transition sections employing expanded metal grids as flow diverting and gas stream diffusing device as the exit ports therefrom.

25 Claims, 6 Drawing Sheets

MULTI STAGE GAS INLET CONSTRUCTION FOR DUST COLLECTORS

This invention relates to gas inlet system constructions gas treating apparatus and more particularly to apparatus for effecting the controlled introduction and distribution of particulate laden gas streams into industrial fabric filter dust collectors.

BACKGROUND OF THE INVENTION

It has long been recognized that a controlled pattern of equable distribution and a control of velocity of a gas stream at the locus of introduction thereof into gas treating apparatus can materially contribute to increased efficiency of operation and extended operating life of the gas treating components thereof. One area of preferential concern has been in the industrial gas filtration field, and particularly in the fabric filter dust collector field. One type of such fabric filter dust collector, also called a "baghouse", typically employs a large number of tubular fabric filters suspended from a tube sheet and interposed in the path of a particulate laden gas stream to effect the separation of the particulate matter from the gaseous carrier as the latter traverses the fabric filter media in its passage from the dirty air plenum to the clean air plenum portion of the filter housing. Another type of fabric filter dust collector employs filter media in the form of flat panels rather than tubular filter bags. In both such types of dust collector, a particulate laden gas stream conventionally enters the filter housing either through a breach in a portion of the lower housing wall defining a dust collecting hopper and generally changes direction and flows upwardly toward the filter media or enters the housing through an opening in the upper sidewall portion of the collector housing defining at least a portion of the perimeter of the dirty air plenum. The particulate matter borne by the incoming gas stream normally accumulates on the upstream filter medium surface and, unless removed by dislodgement, results in a progressive increase in pressure drop across the filter media and in a concommitant reduction in the rate of gas flow through the filter media. In order to avoid excessive particulate accumulation on the upstream surface of the filter media, the filter media is periodically cleaned by utilization of various known techniques, such as pulse jet and reverse flow cleaning and bag shaking. The outcome of such cleaning operation is that a large part of the accummulated particulates are induced to drop off the filter media surface and fall downwardly, under the influence of gravity and generally countercurrent to normal gas flow, toward and into a collection hopper.

In most industrial fabric filter installations of the type described above, the particulate bearing gas stream approaches the filter through a delivery or conveying conduit having a crosssectional area sized to effect gas stream displacement at sufficiently high velocities, usually in the order of 3500–4000 feet/min., to assure maintaining the particulate matter in suspended entrained condition therein. Antithetically thereto, it has been recognized that high efficiency — low loss filter operation and increased operating life of the filter components is dependent, at least in substantial part, by an equable distribution of deposited particulates on all the available filter media surfaces; by minimization, if not avoidance, of turbulence in gas flow within the dirty air plenum; by minimization of particulate re-entrainment during or after filter media cleaning and by minimization of localized wear and abrasion of filter components. As is apparent, the high velocity attended operating parameters of the conduit confined approaching particulate bearing gas stream are basically antithetical to the desired optimum parameters of gas stream displacement within the filter housing and the attempted conversion thereof, normally within localized dimensional restraints, conventionally employs transition ducting and the interposition of turning vanes, baffle plates and related gas flow direction and velocity modifiers to the end of hopefully effecting a more equable distribution of the incoming particulate bearing gas stream relative to the available filter media surface and a marked reduction in its approach velocity in a short length of gas stream travel.

The transition of the shape and velocity of the incoming particulate bearing gas stream to the desirable flow conditions within the fabric filter media housing has been a long standing problem in this art. Many expedients, such as expansion of conduit dimension and the use of baffle plates, turning vanes, flow dividers, perforated plate diffusers, gratings, grids, various types of deflector or distribution plates and the selective location thereof in the path of the incoming gas stream and the like have been suggested to enhance fabric filter performance in the separation and collection of industrial dusts. Illustrative of some of such varied expedients are U.S. Pat. Nos. 4,227,903; 4,544,383; 4,655,804; 4,213,766; 3,926,595; 3,831,350; 3,831,354; 3,739,557; 3,425,189 and 3,155,474. While most of such expedients have resulted in some degree of improved performance, the net results have fallen far short of optimum and the problem of achieving high efficiency and economic operation of industrial fabric filter dust collectors remains a continuing one.

SUMMARY OF THE INVENTION

This invention may be briefly described as an improved inlet construction for industrial fabric filter dust collectors having an operative particle separation zone of predetermined perimetric height, width and depth located within a gas impervious housing and which includes, in its broader aspects, the employment of a pair of velocity reducing transition sections one of which has an exit port of perimetric contour sized and shaped to substantially conform to the height and width and perimetric contour of said particle separation zone and disposed in spaced fluid communicating relation thereto through a complementally contoured opening in said gas impervious housing with said exit port being traversed by a selectively positioned expanded metal grid means. In association therewith, the invention further includes provision of means to equably distribute the gas stream over the upstream surface of said expanded metal grid means and to control the angle of gas stream approach thereto. In such broad aspect, particularly adapted for utilization in fabric filters where the particle separation zone includes a plurality of elongate tubular fabric filter bags, the invention further includes a second and functionally similar velocity reducing transition section disposed immediately upstream of the above described transition section and which also includes a selectively positioned expanded metal grid means traversing its exit port in association with means to equably distribute the incoming gas stream over the upstream surface of the expanded metal grid means and to control the angle of approach thereto. In a further broad aspect, the invention includes provision of a turbulent flow reduction zone disposed immediately downstream of the expanded metal grid means to permit dissipation of localized turbulence induced by passage of the gas stream through the expanded metal grid means.

Among the advantages of the subject invention is the provision of substantially improved operation of gas treating apparatus, and particularly for industrial fabric filter dust collectors of both the tubular bag and panel types, characterized by improved degrees of equable distribution of the particulate laden gas stream relative to the available filter media surface, a markedly improved uniformity of dust loading of the filter elements, significantly higher separation and collection efficiencies, reduced losses, and increased service life of filter components. A further advantage is reductions of particle re-entrainment obtained in larger part by minimization, if said effective elimination, of upward movement of the dirty gas stream in the vicinity of the filter media.

The primary object of this invention is the provision of an improved gas stream inlet construction for gas treating apparatus such as industrial fabric filter type dust collectors.

Other objects and advantages of the subject invention will become apparent from the following portions of this specification and from the appended drawings which illustrate, in accord with the mandate of the patent statutes, presently preferred constructions of industrial fabric filter gas inlet systems incorporating the principles of the invention.

DESCRIPTION OF THE PREFERRED EMBODIMENTS

Figure 1:
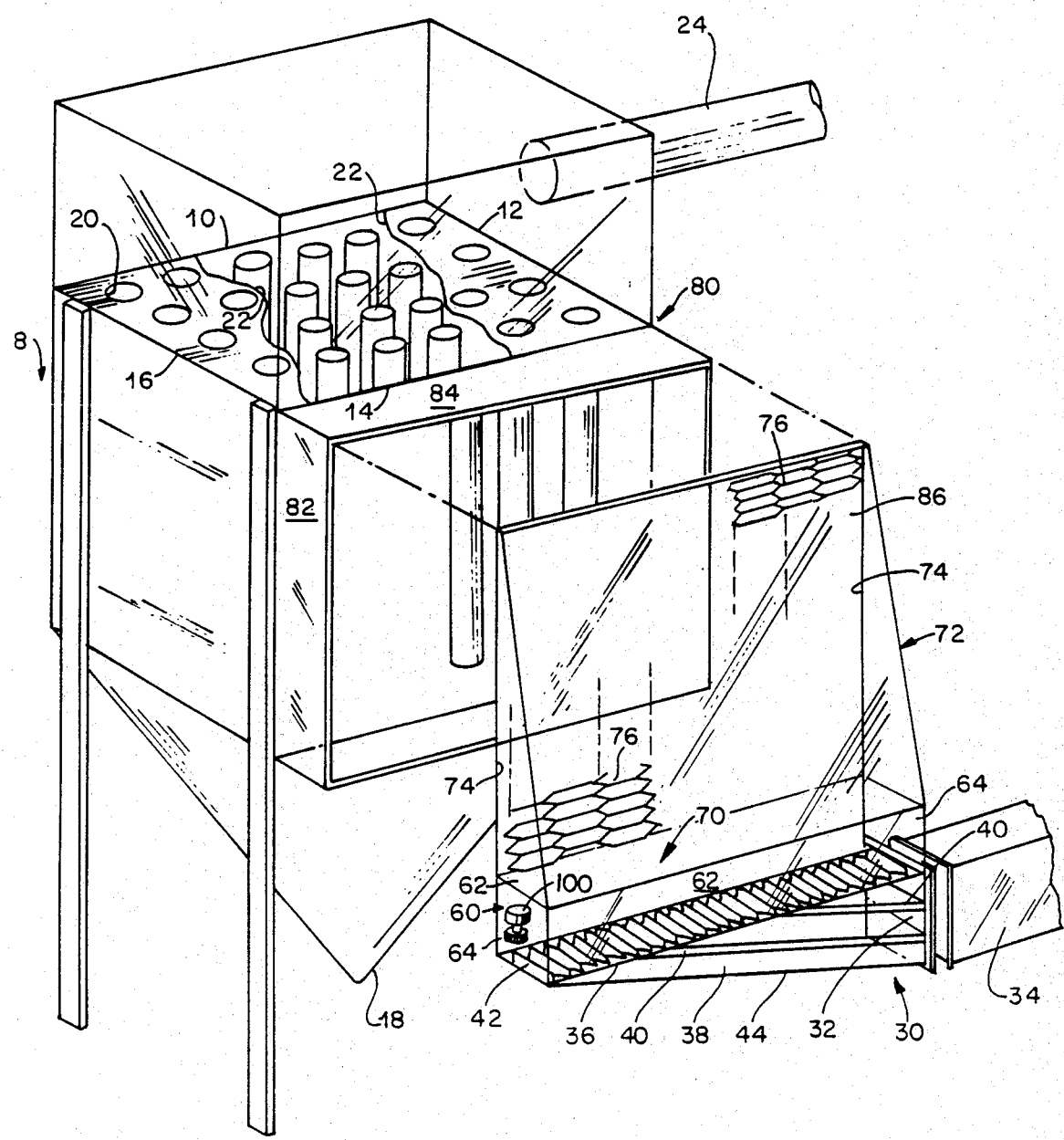
FIG. 1 is a schematic oblique view of components of a conventional fabric filter type of dust collector employing elongate tubular filter bags in association with an exploded view of an improved gas stream inlet assembly embodying the principles of this invention.
Figure 2:
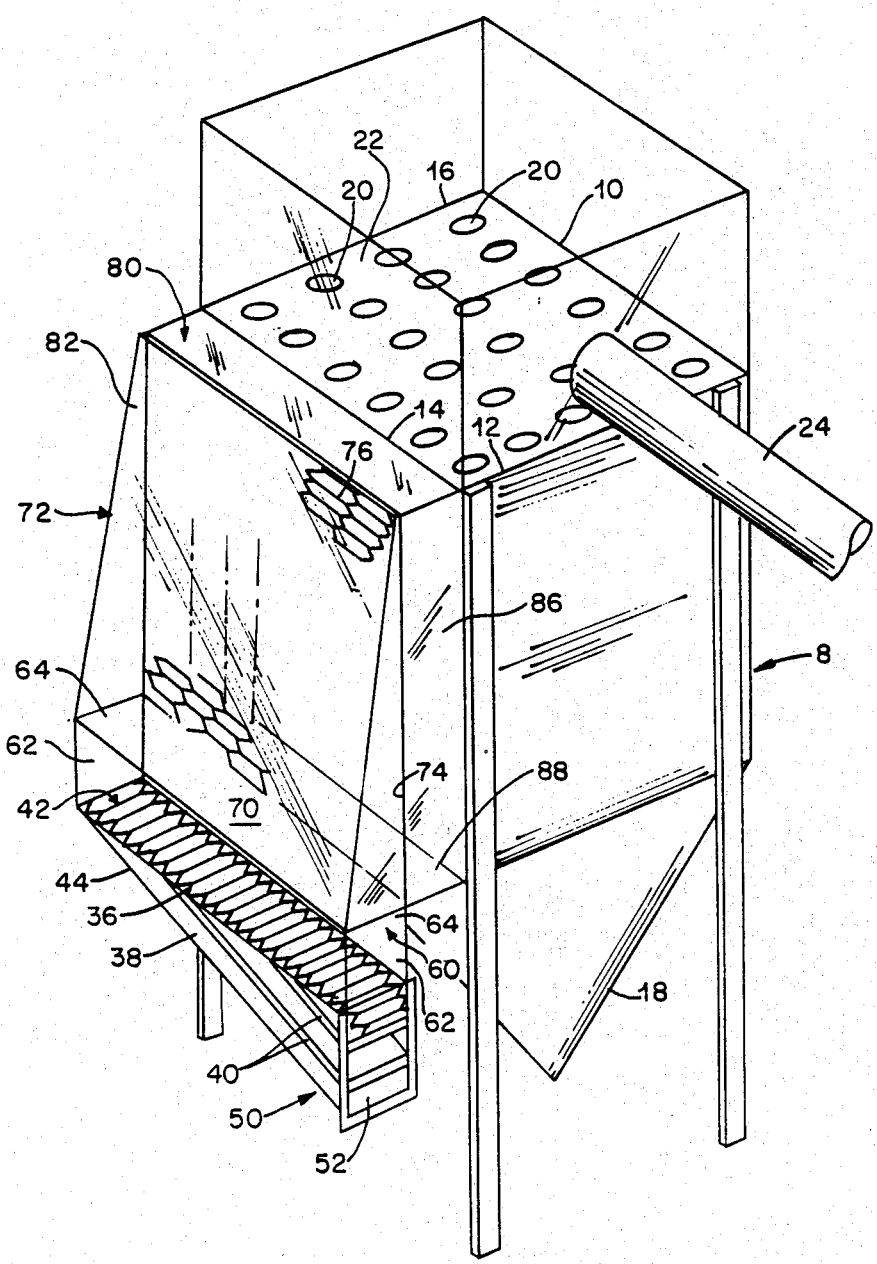
FIG. 2 is a second schematic oblique view of the assemblage of FIG. 1 as viewed from a different direction.
Figure 3:
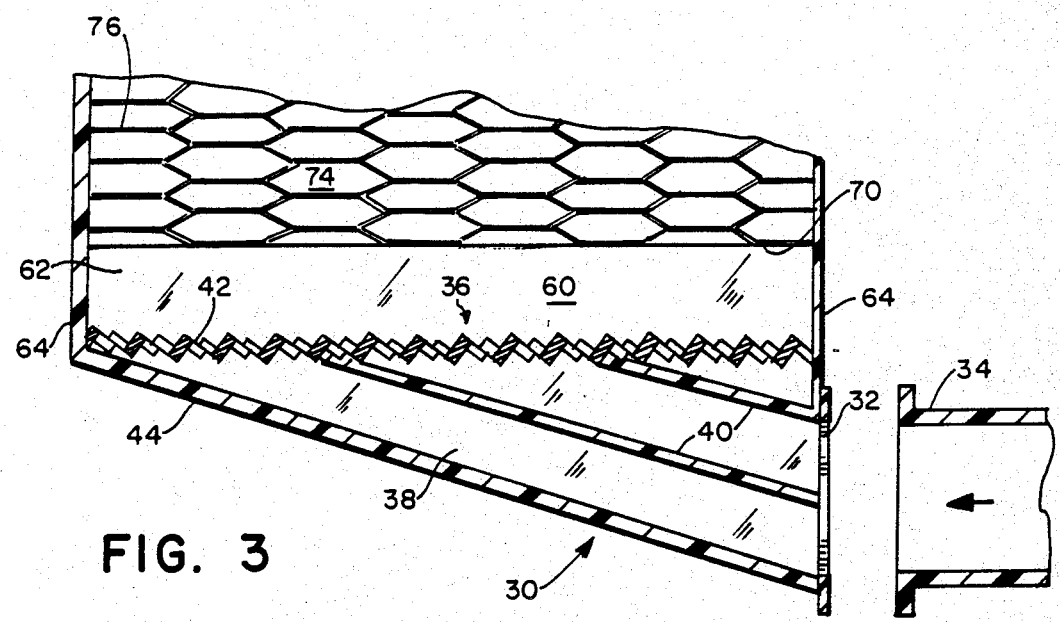
FIG. 3 is an expanded side elevation, partially in section, of a preferred construction for the first velocity reducing transition section incorporated in the assemblage shown in FIGS. 1 and 2.

Referring to the drawings and initially to FIGS. 1 and 2 there is schematically depicted, by way of illustrative example, certain components of a conventional industrial fabric filter dust collector, such as a MikroPulsaire collector as manufactured by the MikroPul Corporation of Summit, New Jersey. As there depicted, such a device conventionally includes a rectangular gas impervious housing, generally designated 8, made up of side panels 10, 12, 14 and 16 and dependently terminating in a pyramidal dust collecting hopper 18. Positioned within the housing 8 are a plurality of elongate vertically disposed fabric filter bags 20 conventionally suspended from a tube sheet 22 in uniform spaced relation from each other. Conventionally, the contained volume disposed beneath the tube sheet 22 and externally of the filter tubes 20 is broadly delineated as a "dirty gas plenum". Similarly, the contained volume located above the tube sheet 22 is broadly delineated as a "filtered" or "clean gas plenum", and such is normally vented through a clean gas delivery conduit 24.

In normal filtering operations, a particulate laden gas stream is most commonly introduced into the dirty air plenum through a breach in the wall of the dust collecting hopper 18. Such gas is induced to flow upwardly toward and through the filter media 20 and into the clean gas plenum, usually by action of a fan or other prime movant located downstream of the delivery conduit 24. As previously noted and depicted in the above listed patents, turning vanes, baffle plates and other gas flow modifiers are often placed on the path of the incoming gas stream in the hopper 18 in an effort to change the direction of flow upwardly toward the filter media and to equably distribute the gas over the available fabric filter media surface. As the gas passes through the filter media 20 the particulates entrained therein are separated and accumulate on the upstream (here the external) surfaces of such media. As also previously pointed out, such accumulated particulates are removed by a cleaning operation such as pulse jet cleaning, reverse flow cleaning or by shaking. The particulates dislodged by the cleaning operation fall, under the influence of gravity and countercurrent to the direction of gas flow and normally with undesirable amounts of reentrainment thereof, into the dust collection hopper 18.

In order to provide a markedly improved equable distribution, non-turbulent and reduced velocity gas flow to the totality of available filter media surface, there is herein provided an improved gas inlet system. Such improved gas inlet system includes a first velocity reducing transition section, generally designated 30, having an entry port 32 sized and shaped to receive a high velocity particulate laden gas stream of a first predetermined cross-sectional area as determined by the dimensions and shape of a conveying duct 34. Conventionally such incoming "dirty" gas stream is conveyed at velocities of about 3500 to 4000 feet per minute to assure maintainence of particulate entrainment and to thereby effectively preclude particle separation in the conveying system. Disposed at right angles to the entry port 32 is an exit port 36 of a second and appreciably larger crosssectional area. In the illustrated embodiment, the width of the entry port 32 and exit port 36 are the same and the increase in exit port area is obtained by markedly increasing the length thereof. Equable gas flow from the entry port 32 toward the full extant of the exit port 36 is directed by a tapering duct section 38, and, if needed for improved equable flow distribution approaching the exit port 36, by one or more flow separating and channeling partitions 40. Disposed within and traversing the full extent of the exit port 36 is a selectively positioned expanded metal grid 42 whose angled strands act as a multiple series of turning vanes to turn or divert and equably distribute the portions of the incoming gas flow upwardly through the exit port 36.

Figure 4:
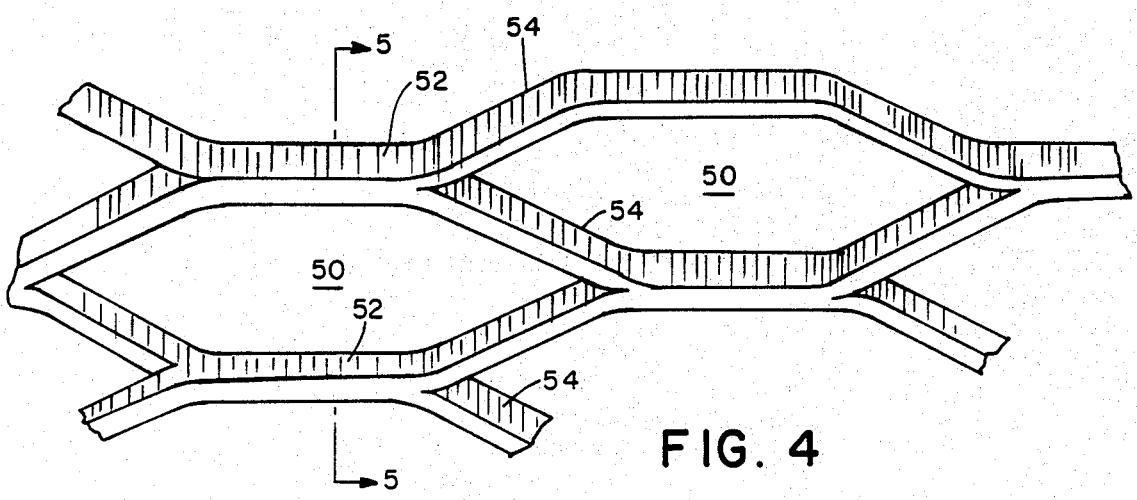
FIG. 4 is an enlarged scale plan view of suitable expanded metal grid material employable in the practice of this invention.
Figure 5:
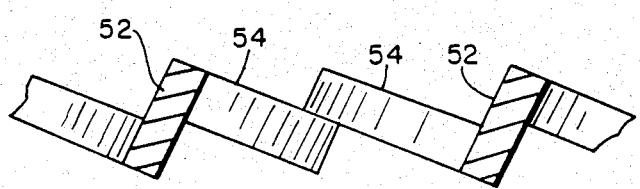
FIG. 5 is a section as taken on the line 5—5 of FIG. 4.
Figure 6:
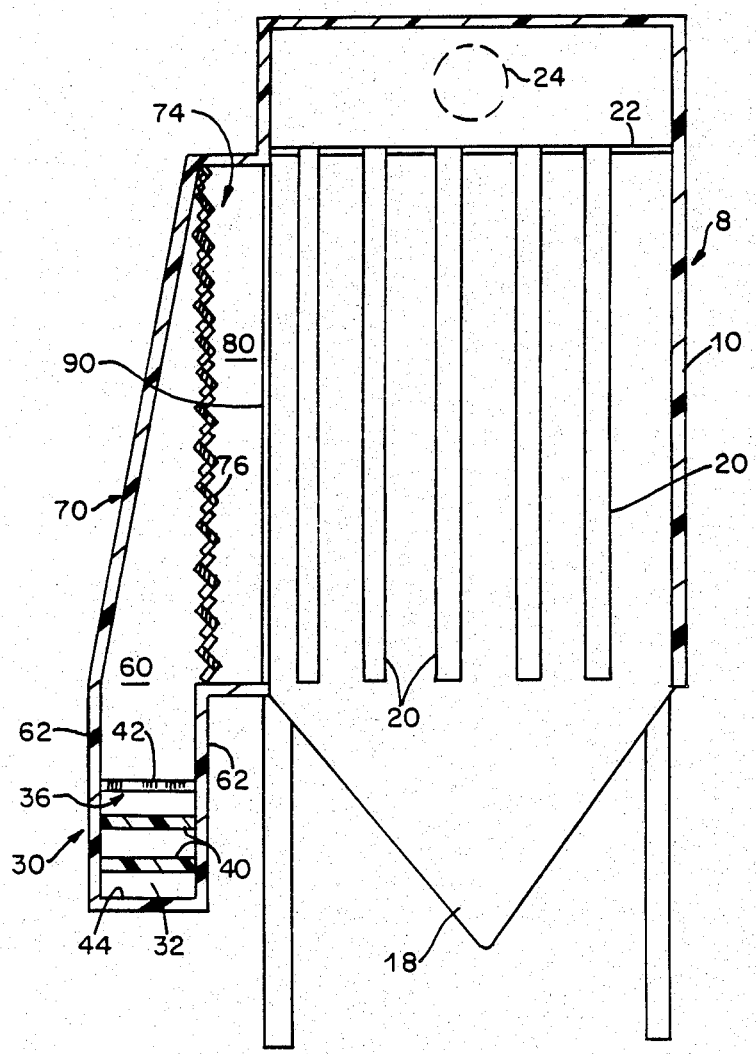
FIG. 6 is a side elevation, partially in section, of a preferred construction for the second velocity reducing transition section incorporated in the assembly shown in FIGS. 1 and 2.

As shown in FIGS. 4 and 5, the expanded metal grid is a commercially available fabricated product that results from the selective deformation, as effected by either punching or by slitting and drawing, of a flat sheet of metal to form a series of elongated but regular diamond, or preferably hexagonal, shaped openings 50 therein. The metal displaced by the deformation process forms a three dimensional border surrounding each opening 50 and this bordering metal includes a portion in the form of double width angled strands 52 which are disposed at an angle to the base sheets original planar dimension and determine the effective overall thickness of the deformed product and adjacent angularly skewed single width strands 54.

As indicated above, the expanded metal grid is a commercially available fabricated product, conventionally used as flooring for runways, catwalks, platforms, stair treads and like purposes. Suitable expanded metal grid material can be obtained as RYEX Expanded Metal Grating from the Ryerson Division of Inland Steel Corporation and from McNichols Co. of Tampa, Florida. As identified in the literature of the above fabricators, the type of expanded metal grid that is of utility in the performance of this invention is identified as the "standard" version of expanded metal grid material wherein the strands are angularly offset. While such "standard" version of expanded metal grid material is available with either diamond shaped or hexagonal shaped openings 50, the hexagonal opening shaped material has proved more effective in the diversion of gas flow and is preferred. Available evidence to date indicates that the diamond shape is only about 70% as effective as the hexagonal shape for diverting gas flow.

Carbon steel grades of domestically available expanded metal grid material are apparently produced as 1.2, 2.5, 3.0, 3.14, 4.0, 4.25, 5, 6.25 and 7 pounds per square foot grades. Of these, hexagonal opening material of the 3.0, 4.0, 5.0, 6.25 and 7.0 pound per square foot grades are the most useful. As will be apparent, it is the geometrical configuration of the expanded metal grid material that is a significant controlling operating parameter and, as such, other material of metallic or non-metallic character and formed into a similar configuration could also be employed.

Figure 7:
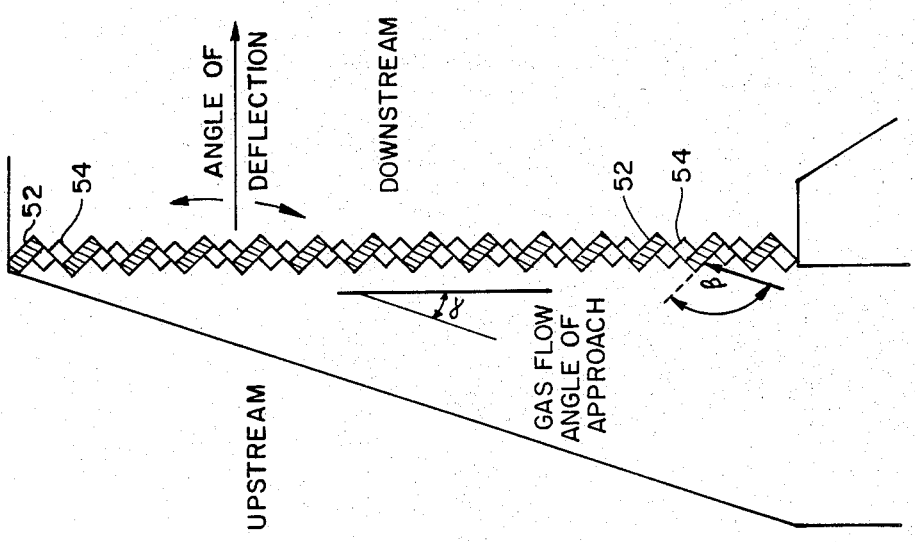
FIG. 7 is a schematic representation of controlled gas stream approach to a selectively positioned expanded metal grid and effective diversion thereof.

Efforts to date have indicated that the mere use of expanded metal will not, in and of itself, provide for improved filter performance. Other factors that must be observed include the selective positioning of the metal grid material, the control of the angle of approach of the gas stream to the face of the expanded metal grid, the equable distribution of the approaching gas stream over the full surface of the selectively positioned expanded metal grid and reducing the gas stream velocity to a degree desirable to decrease or minimize turbulence. Experiments have indicated that, as the bordering strands 52 and 54 defining the hexagonal openings in the expanded metal grid become wider and thicker, in accord with the weight of the product in pounds per square foot, and the openings 50 become smaller and the total free area of such openings decreases, the greater is the magnitude of the deflection of the gas stream. Thus it appears that for a given gas stream approach angle, the heavier grades of expanded metal will deflect the gas stream flow more than the lighter grades. FIG. 7 depicts the desired orientation of the expanded metal grid material relative to the approaching gas stream. It has been noted that the angle of gas stream deflection not only varies for the different grades of expanded metal but also with each grade as the approach angle is changed. In general an approach angle $\alpha$ of from 5 to about 30 is preferred. Stated otherwise, preferred orientation of the expanded metal grid is present when the angle of approach of the incoming gas stream is at least normal to or forms an obtuse angle $\beta$ with the double width strand surface 52.

Referring back to FIGS. 1 and 2 it will now be apparent that the converging character of the transition section bottom wall 44 relative to the grid 42 and the resultant progressively decreasing cross-sectional area of the section in the direction of gas flow, together with the vanes 40, are directed to providing an equable distribution of gas flow as it approaches the expanded metal grid 42 disposed in the exit port 36. In association therewith, the markedly increased area of the exit port 36 as compared to the cross-sectional area of the entry port 32 functions to provide a marked reduction in gas velocity as it is diverted and passes upwardly through the exit port 36.

The passage of the gas stream through, and diversion by, the expanded metal grid 42 will inherently produce some degree of localized turbulence in the form of eddy currents and vortices. In order to dissipate and effectively eliminate such localized turbulence, a turbulent flow reduction zone 60, defined by the upstream surface of the grid 42 and gas impervious side walls 62 and end walls 64, is located immediately downstream of the grid 42. Such zone 60 is in the general nature of a close walled conduit of limited length and of a cross-sectional extant equal to that of the exit port 36. Such zone 60 functions to permit dissipation of localized turbulence induced by the passage of the gas stream through the first expanded metal grid 42 and further reduction in velocity thereof.

Referring now to FIGS. 1, 2, 3 and 6, the exit end of the turbulent flow reduction zone 60 serves as the entry port 70 of a second velocity reducing transition section, generally designated 72. The entry port 70 is suitably of a cross-sectional area generally equal to that of the exit port 36 of the first transition section 30. Disposed at right angles to such entry port 70 is an exit port 74 of markedly greater cross-sectional area. Desirably, the exit port 74 of this second transition section 72 is of a perimetric contour, here rectangular, sized to substantially conform to the height and width of the particle separation zone as the latter is defined by the overall height and width of the assemblage of filter bags 20 within the dirty gas plenum. As was the case with the first transition section 30, the exit port 74 is traversed by a second expanded metal grid 76.

In order to effect an equable distribution of the particulate gas stream over the available area of the exit port 74 and at a proper angle of approach, as above described, to the expanded metal grid 76, the second transition section 72 is also of tapering character and of progressively decreasing cross-sectional area in the direction of gas flow. If desired, flow splitting channel members or vanes of the type shown and described in conjunction with the first transition section 30, may also be included in the second transition section 72. The turbulence reduced and reduced velocity gas stream emanating from the first turbulent flow reduction zone 60 will be markedly further reduced in velocity and diverted at right angles as it passes through the expanded metal grid 76 to a direction effectively perpendicular to the surface of the filter bags 20 and equably distributed over an area substantially conforming both in shape and dimension to that of the particle separation zone. As will be apparent to those skilled in this art, local geometry conditions, and as the presence of obstructions, catwalks and the like may function to limit the area of the exit port 74. Desirably however such exit port should be as large as possible with respect to the height and width of the particle separation zone.

Since the passage of the gas stream, albeit at reduced velocity, through the second expanded metal grid 76 will be attended by localized turbulence adjacent the downstream surface thereof, a second turbulence reduction zone 80, again in the general form of a short length closed conduit of a cross section generally conforming in size and shape to the exit port and formed by walls 82, 84, 86 and 88, is disposed immediately downstream of the grid 76 and intermediate raid grid and the particle separation zone within the filter housing. The downstream end of the second turbulence reduction zone 80 fluidly communicates with an opening 90 in the wall of the perimetric housing 8 again sized to substantially conform both in shape and dimension with the particle separation zone.

Figure 8:
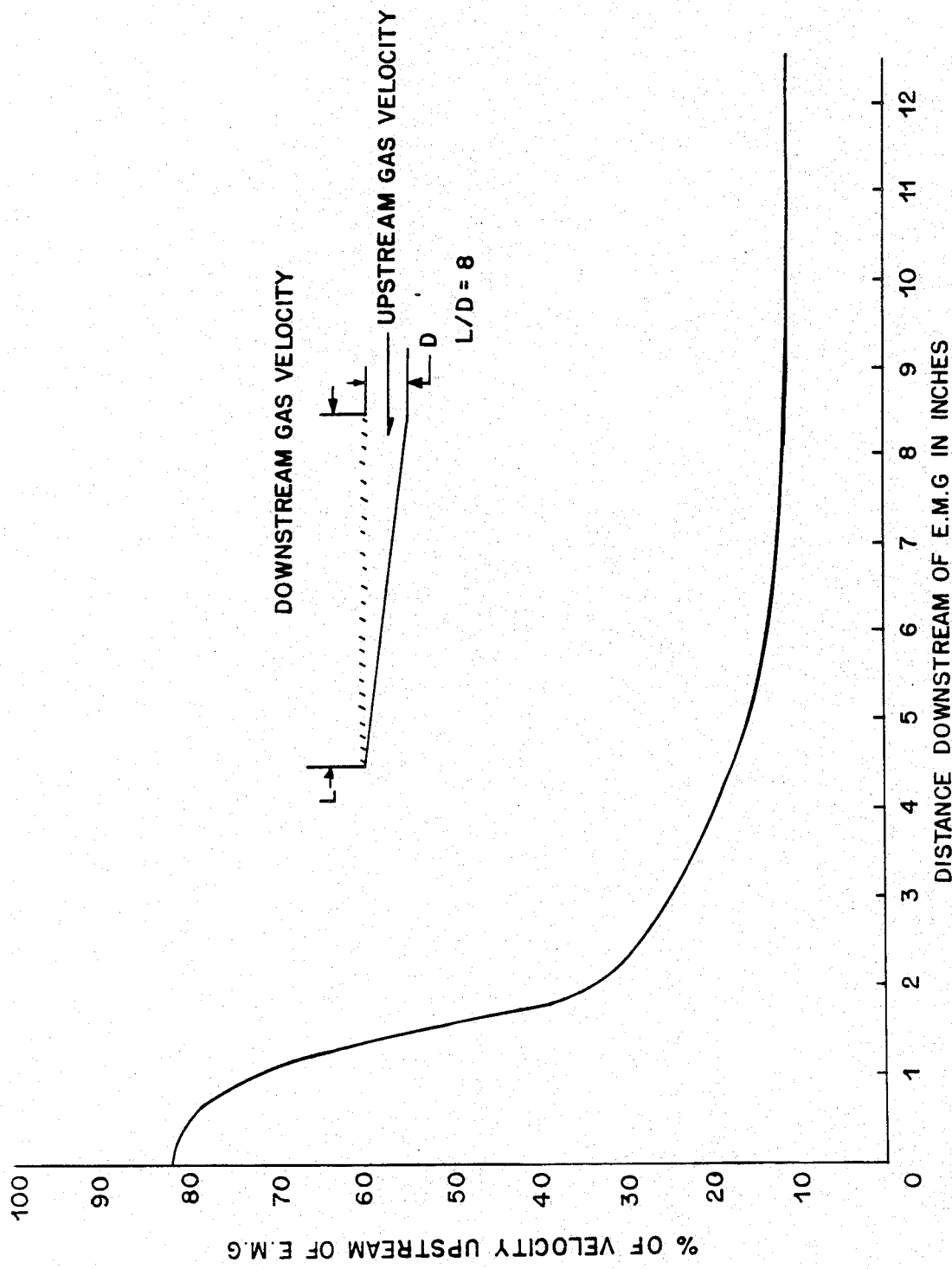
FIG. 8 is a plot of observed data illustrating drop in gas velocity and reduction in turbulence on the downstream side of an expanded metal grid.

FIG. 8 illustrates the marked drop in localized gas stream velocity within the turbulence reduction zones and immediately downstream of the expanded metal grids.

Since the passage of particulates through the expanded metal grids will, for at least some types of particulates, result in a separation and accummulation of particulate matter on the surfaces of the grids, it will be desirable in such instances to provide some means for dislodging such accummulated particulates. To the above end, a rapping device, as for example in the form of a solenoid operated hammer member 100, may be positioned on the turbulence reduction zones to impact and jar the grids.

In summary, in the depicted unit the first transition section 30 will operate to direct the incoming high velocity gas stream through a right angle turn. As the gas flow enters the initial expanded metal grid 42, the latter functions to both divert, essentially at a right angle, and, in association with the the turbulent flow reduction zone 60, to uniformly reduce the gas stream velocity prior to its entry into the second transition section 72. Desirably, the first expanded metal grid 42 has the same width as the inlet conduit 34 and a length that matches the width of the second expanded metal grid 76. If equably distributed, the gas flow encountering the first expanded metal grid 42 will be expanded with a consequent velocity reduction and directed to properly approach the second expanded grid 76 in equably distributed character. The reduced velocity gas stream will again be turned at right angles and further reduced in average velocity as it passes through the second expanded metal grid 76 and zone 80. The gas stream emanating from the second grid 76 and adjacent turbulence reduction zone 80 will be of a perimetric contour, both as to shape and dimension, desirably substantially matching that of the opening 90 in the housing 8 and of the particle separation zone therewithin and will be moving in a direction effectively perpendicular to the centerline of the filter media assembly. With the herein disclosed two stage transition sections and expanded metal grids disposed in the exit ports thereof, the velocity of the gas stream can readily be reduced by a factor of 10 or more and converted in form for a markedly improved equable distribution relative to the available filter media surfaces and in a path devoid of upwardly moving components with consequent reduction of particle reentrainment. With the flexibility afforded by use of selective approach angles to the expanded metal grids of from about 5 to 30 degrees, depending upon the grade of expanded metal employed in each of the two stages, any number of specific double stage arrangements can be designed to accomodate various inlet gas velocities, various dust loadings and other characteristics of the particulate laden gas stream being conveyed to the filter.

As will now be apparent the foregoing depicted and described construction functions to effect entry of the gas stream into the housing essentially perpendicular to the longitudinal axis of the housing 8 and to the longitudinal centerline of the filter media disposed therewithin. Such direction of entry effectively eliminates the generation of any upwardly moving components of the gas stream within the housing with the heretofor described diminution of reentrainment.

The above described nature of direction of reduced velocity gas stream entry also results in a progressive diminution of gas stream velocity as the gas stream traverses the depth of the particule separation zone.

Figure 9A:
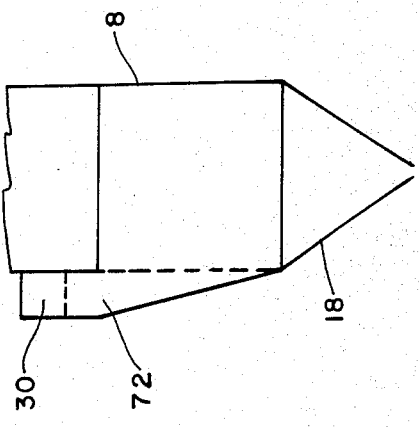
FIGS. 9A and 9B are schematic representations of a dust collector having a top entry gas inlet construction incorporating the principles of this invention.
Figure 9B:
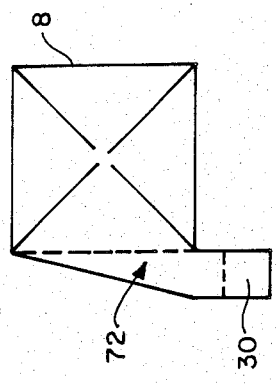
Figure 10A:
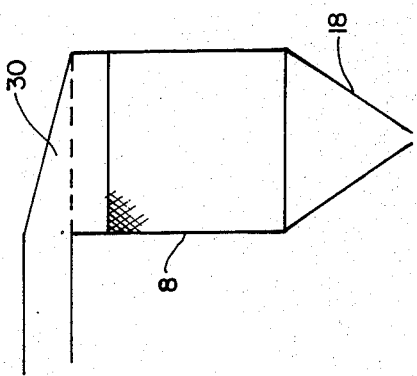
FIGS. 10A and 10B are schematic representations of a dust collector having a side entry gas inlet construction incorporating the principles of this invention.
Figure 10B:
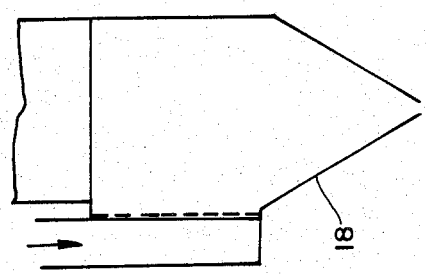

The above described side entry of the gas stream into the housing initially brought the incoming gas stream to the filter in the vicinity of the lower portion of the housing. Depending upon the local geometry of the filter at the locus of use thereof, gas stream entry into the first transition section 30 can be effected at the top of the housing 8, as shown in FIGS. 9A and 9B or from the side of the housing 8, as shown in FIGS. 10A and 10B.

It will also be apparent to those skilled in the art that the converging character of the transition sections could be effected by having the solid base wall thereof disposed parallel to the direction of gas flow and by having the expanded metal grids disposed at an angle thereto and other than at right angles to the plane of the entry aperture.

Having thus described our invention; we claim:

1. Apparatus for treating gas being conveyed in a moving high velocity gas stream of first predetermined cross-sectional area,
   gas treating means perimetrically defining a gas treatment zone of predetermined height, width and depth,
   a gas impervious housing perimetrically surrounding said gas treatment zone,
   gas inlet means for equably distributing and introducing said gas stream at reduced velocity into said gas treatment zone, said gas inlet means comprising,
   a first velocity reducing transition section having an entry port of substantially said first predetermined crossectional area for reception of said high velocity gas stream, an exit port of second and larger predetermined cross-sectional area to deliver said gas stream therefrom at a first reduced velocity, and first expanded metal grid means of overall planar character selectively disposed in and traversing said exit port for equably distributing and effecting a change in the direction of flow of said gas stream of at least 90°, means defining a first turbulent flow reduction zone located immediately downstream of said first expanded metal grid means to permit dissipation of localized turbulence induced by passage of said gas stream through said first expanded metal grid means, a second velocity reducing transition section having an entry port of substantially said second predetermined crosssectional area to receive said reduced velocity gas stream emanating from said first turbulent flow reduction zone, an exit port of a third and still larger cross-sectional perimetrically contoured to conform to the shape, height and width of at least a substantial portion of said gas treatment zone and disposed in spaced fluid communicating relation thereto through a complementally contoured opening in said gas impervious housing to deliver said gas stream at a second and further reduced velocity, and second expanded metal grid means of overall planar character selectively disposed in and traversing said exit port for equably distributing and effecting a change in the direction of flow of said gas stream of at least 90°, and means defining a second turbulent flow reduction zone immediately downstream of said second expanded metal grid means and intermediate said second grid means and said gas treatment zone to permit dissipation of localized turbulence induced by passage of said gas stream through said second expanded metal grid means, said first and second expanded metal grid means each having a plurality of polygonal openings therein each bounded by a three dimensional border of angularly offset strands, at least one strand of which is of a double width disposed in generally facing relation to the approaching gas stream.

2. Apparatus as set forth in claim 1 wherein said gas stream approaches each of said expanded metal grid means at an angle of about 5° to 30° from the overall plane thereof.

3. Apparatus as set forth in claim 1 wherein said gas treating means comprises particle separation means.

4. The apparatus as set forth in claim 3 wherein said means defining said second turbulent flow reduction zone is perimetrically contoured to substantially conform to the height and width of said gas treatment zone.

5. Apparatus as set forth in claim 1 where said first velocity reducing transition section includes means for effecting an equable distribution of the approaching gas stream on the upstream side of said first expanded metal grid means.

6. Apparatus as set forth in claim 1 wherein said entry and exit ports in said first velocity reducing transition section are at right angles to each other.

7. Apparatus as set forth in claim 1 wherein said entry and exit ports in said second velocity reducing transition section are at right angles to each other.

8. Apparatus as set forth in claim 1 wherein said change in direction of gas stream flow effected by said first expanded metal grid means is at least 90°.

9. Apparatus as set forth in claim 8 wherein said polygonal openings in said first and second grid means are hexagonal.

10. Apparatus as set forth in claim 1 wherein said change in direction of gas stream flow effected by said second expanded metal grid means is at least 90°.

11. Apparatus as set forth in claim 1 wherein said polygonal openings in said first and second grid means are hexagonal.

12. In a fabric filter dust collector for separating and collecting entrained particulate matter being conveyed in a moving high velocity gas stream of first predetermined cross-sectional area, a multiplicity of fabric filter particle separating means arranged in spaced parallel relation to each other and perimetrically defining a particle separation zone of predetermined height, width and depth, a gas impervious housing surrounding said particle separation zone and dependently terminating in a particle collection hopper disposed beneath said particle separating means, gas inlet means for equably distributing and introducing said gas stream and entrained particulate matter at reduced velocity into said particle separation zone, said gas inlet means comprising, a first velocity reducing transition section having an entry port of substantially said first predetermined cross-sectional area for reception of said high velocity gas stream, an exit port of second and larger predetermined cross-sectional area to deliver said gas stream therefrom at a first reduced velocity, and first expanded metal grid means of overall planar character selectively disposed in and traversing said exit port for equably distributing and effecting a change in the direction of flow of said gas stream of at least 90°, and a second velocity reducing transition section having an entry port of substantially said second predetermined cross-sectional area to receive said reduced velocity gas stream emanating from said first velocity reducing transition section, an exit port of a third and still larger cross-section perimetrically contoured to conform to the shape, height and width of at least a substantial portion of said particle separation zone and disposed in spaced fluid communicating relation thereto through a complementally contoured opening in said gas impervious housing to deliver said gas stream therefrom at a second and further reduced velocity, and second expanded metal grid means of overall planar character selectively disposed in and traversing said exit port for equably distributing and effecting a change in the direction of flow of said gas stream of at least 90°, said first and second expanded metal grid means each having a plurality of polygonal openings therein each bounded by a three dimensional border of angled strands at least one strand of which is of a double width disposed in facing relation to the approaching gas stream.

13. Fabric filter dust collector apparatus as set forth in claim 12 further including means defining at least one turbulent flow reduction zone located immediately downstream of one of said expanded metal grid means to permit dissipation of localized turbulence induced by passage of said gas stream through said one of said expanded metal grid means.

14. Fabric filter dust collector apparatus as set forth in claim 12 further including means defining a first turbulent flow reduction zone immediately downstream of said first expanded metal grid means to permit dissipation of localized turbulance induced by passage of said gas stream through said first expanded metal grid means, and means defining a second turbulent flow reduction zone immediately downstream of said second expanded metal grid means and intermediate said second expanded metal grid means and said particle separation zone to permit dissipation of localized turbulence induced by passage of said gas stream through said second expanded metal grid means.

15. Fabric filter dust collector apparatus as set forth in claim 14 wherein said means defining said second turbulent flow reduction zone is perimetrically contoured to conform to the shape, height and width of at least a substantial portion of said particle separation zone.

16. Fabric filter dust collector apparatus as set forth in claim 12 wherein said entry and exit ports in each of said velocity reducing transition sections are at right angles to each other and each said transition section is of progressively diminishing crosssectional area to effect a substantially equable distribution of the approaching gas stream on the upstream side of each of the expanded metal grid means.

17. Fabric filter dust collector apparatus as set forth in claim 12 further including flow directing vanes in at least one of said velocity reducing transition sections.

18. Fabric filter dust collector apparatus as set forth in claim 12 wherein said gas stream approaches each of said expanded metal grid means at an angle of about 5° to 30° from the overall plane thereof.

19. Fabric filter dust collecting apparatus as set forth in claim 12 wherein said fabric filter particle separating means comprises elongate tubular filter bags.

20. Fabric filter dust collecting apparatus as set forth in claim 12 wherein said fabric filter particle separating means comprises elongate filter panels.

21. Fabric filter dust collection apparatus as set forth in claim 12 further including means for dislodging particulate matter that accumulates on at least one of said expanded metal grid means.

22. Fabric filter dust collection apparatus as set forth in claim 12 wherein said gas passing through the housing is moving in a direction substantially perpendicular to the longitudinal center line of said particle separation means.

23. In a fabric filter dust collector for separating and collecting entrained particulate matter being conveyed in a moving high velocity gas stream of first predetermined cross-sectional area, a multiplicity of vertically oriented elongate tubular filter bags perimetrically defining a particle separation zone of predetermined height, width and depth, a gas impervious housing perimetrically surrounding said particle separation zone and dependently terminating in a particle collection hopper disposed below said filter bags, gas inlet means for equably distributing and introducing said gas stream at reduced velocity into said particle separation zone, said gas inlet means comprising, a first velocity reducing transition section having an entry port of substantially said first predetermined cross-sectional area for reception of said high velocity gas stream, an exit port of second and larger predetermined cross-sectional area to deliver said gas stream therefrom at a first reduced velocity, first expanded metal grid means of overall planar character selectively disposed in and traversing said exit port for equably distributing and changing the direction of flow of said gas stream through at least 90° and means for directing said gas stream to approach said first expanded metal grid means at an angle of about 5° to 30° from the overall plane thereof, means defining a first turbulent flow reduction zone located immediately downstream of said first expanded metal grid means to permit dissipation of localized turbulence induced by passage of said gas stream through said first expanded metal grid means, a second velocity reducing transition section having an entry port of substantially said second predetermined crosssectional area to receive said reduced velocity gas stream emanating from said first turbulent flow reduction zone, an exit port of a third and still larger cross-section perimetrically contoured to conform to the shape, height and width of at least a substantial portion of said particle separation zone and disposed in spaced fluid communicating relation thereto through a complementally contoured opening in a side wall of said gas impervious housing to deliver said gas stream at a second and further reduced velocity toward said particle separation zone in a direction substantially perpendicular to the longitudinal center line of said filter bags, and second expanded metal grid means of overall planar character selectively disposed in and traversing said exit port for equably distributing and changing the direction of flow of said gas stream through at least 90°, means for directing said gas stream to approach said second expanded metal grid means at an angle of about 5° to 30° from the overall plane thereof, and means defining a second turbulent flow reduction zone immediately downstream of said second expanded metal grid means and intermediate said second expanded metal grid means and said particle separation zone to permit dissipation of localized turbulence induced by passage of said gas stream through said second expanded metal grid means, said first and second expanded metal grid means such having a plurality of polygonal openings therein bounded by a three dimensional border of angularly offset strands, at least one strand of which is of a double width disposed in generally facing relation to the approaching gas stream.

24. Fabric filter dust collector apparatus as set forth in claim 23 further including means for dislodging particulate matter accummulating on at least one of said expanded metal grid means.

25. Apparatus as set forth in claim 23 wherein said polygonal openings in said first and second grid means are hexagonal.

* * * * *